United States Patent
Banthia

[11] Patent Number: 5,922,044
[45] Date of Patent: Jul. 13, 1999

[54] SYSTEM AND METHOD FOR PROVIDING INFORMATION TO APPLETS IN A VIRTUAL MACHINE

[75] Inventor: Prakash C. Banthia, Santa Clara, Calif.

[73] Assignee: 3Com Corporation, Santa Clara, Calif.

[21] Appl. No.: 08/873,440

[22] Filed: Jun. 12, 1997

Related U.S. Application Data

[63] Continuation-in-part of application No. 08/766,274, Dec. 13, 1996
[60] Provisional application No. 60/040,876, Mar. 21, 1997.

[51] Int. Cl.$^6$ .................................................. G06F 13/00
[52] U.S. Cl. ............................................................ 709/203
[58] Field of Search ........................ 364/DIG. 1, DIG. 2; 345/335, 338, 340, 682; 395/200.33

[56] References Cited

U.S. PATENT DOCUMENTS

| | | | |
|---|---|---|---|
| 5,572,648 | 11/1996 | Bibayan | 395/340 |
| 5,706,502 | 1/1998 | Foley et al. | 395/610 |
| 5,736,984 | 4/1998 | Jellinek et al. | 345/338 |
| 5,742,768 | 4/1998 | Gennaro et al. | 395/200.33 |

*Primary Examiner*—Robert B. Harrell
*Attorney, Agent, or Firm*—Townsend and Townsend and Crew LLP; Ketan S. Vakil

[57] ABSTRACT

A system and method for simultaneously displaying a set of display applets while optimizing the number of server connections. A connection to the server is established by a controlling applet. The controlling applet receives data from the server, parses the data, transmits the data to a set of display applets, and displays the set of display applets on a single browser window. Even if an applet is torn off a single browser window and moved to another window, the controlling applet continually maintains a link to the server to continually update the data values on the torn off applet as well as on the set of display applets on the single browser window.

19 Claims, 4 Drawing Sheets

SYSTEM AND METHOD FOR PROVIDING INFORMATION TO APPLETS IN A VIRTUAL MACHINE

CROSS-REFERENCE TO RELATED APPLICATIONS

This application claims priority from provisional patent application 60/040,876, filed Mar. 21, 1997. This application is a continuation-in-part of 08/766,274, filed Dec. 13, 1996.

BACKGROUND OF THE INVENTION

The present invention relates to applets in a virtual machine and more particularly to the display of multiple applets on a single browser window while optimizing the number of server connections.

The Internet is a global network that allows users to communicate information. To access this information, a user executes a client program, usually a Web browser such as HotJava, Netscape, or Microsoft Explorer, which connects the user to the Internet. The Web browser issues specific commands to the Internet which accesses a particular Web server. A Web server is a computer system that provides information to the client through the Internet link.

Once a connection to the Internet has been established, the user can then retrieve a multitude of Web sites. A Web site is a series of screen displays (Web pages) consisting of text, pictorial, and other information about a particular subject, organization, or company. Web pages can be created using HyperText Markup Language ("HTML"). A particular Web site can be retrieved from the Internet by specifying its Web site address to the Web browser.

Java is an increasingly well-known and popular object-oriented programming language which was developed by Sun Microsystems in 1995. Java's architecture allows machine-independent executable instructions to be distributed over a network onto a Java enabled Web browser. Unlike many other programming languages, Java is interpreted and is designed to be highly machine independent and can run under many browser clients. This includes Sun workstations, Pcs, Macs, PDAs, and even television sets. In one implementation, a Java interpreter runs within a client's processor space and can execute the Java interpreted instructions on the client within the Web browser.

Java supports all of the productivity enhancing features of object-oriented programming. For example, Java enables programmers to use existing classes to create new classes. This is called inheritance. A class is a category of objects. By defining a new class, a programmer specifies the shape and behavior of all objects later defined to be instances of that class, including the data they will contain and the operations they will perform.

During the development of Java, the developers realized that code downloaded from a network may be less secure than code that resides on a local hard drive. Therefore, one of the desirable features of Java is the fact that Java executable instructions have only limited access to computer system resources, such as the file system. Among other things, this provides some protection from viruses or from maliciously designed code or erroneous code from corrupting system resources.

Java utilizes applets as a security mechanism to prevent any linked viruses from attaching to the client's hard drive. An applet is a small program with a single purpose designed to be distributed across a network, usually the Internet, often to add extra functionality to some other program, such as a Web browser. In Java, a user can specify exactly which directories applets can read from and write to.

An applet is not executed directly by the processor, but rather by an implementation of a Java virtual machine (VM).

The Java VM is another name for the Java interpreter. The Java interpreter is built into many popular Web browsers such as Netscape and HotJava. The Java VM produces no machine instructions specific to a particular processor but rather single compiled versions of the program, called bytecodes. These bytecodes are downloaded onto the Web browser in the form of an applet, and the VM interprets and runs the program code.

An application differs from an applet in that an application is a stand alone program, usually executable code, that resides on a processor. If an application contains a virus and the application is downloaded from the Internet onto the processor, the processor may become infected. Hence, an applet provides a more secure medium for data transmission as compared to an application.

In an operating system environment, multiple programs having multiple applets can be run simultaneously. Each of these programs has at least one thread within it. A thread is a parallel path of execution which runs independently. Problems arise when multiple threads attempt to connect to a server simultaneously. For example, suppose a user wishes to display or update multiple applets on a single Web page. This requires that each applet establish its own connection to the server. If more than one applet requests data from the server at the same time, one applet may be competing with another applet for a server connection. Hence, each applet may be waiting to initiate a server connection resulting in inefficiencies. Furthermore, a first applet may be accessing data file A and waiting for data file B and a second applet may be accessing data file B and waiting for data file A resulting in deadlock.

Ideally, what is needed is a mechanism for allowing a group of applets to communicate with a server efficiently.

SUMMARY OF THE INVENTION

The present invention provides systems and methods for simultaneously displaying a set of applets while optimizing the number of server connections.

In one embodiment, the invention provides a method of providing data to a set of display applets, comprising the steps of: establishing a connection from a client to a server by a controlling applet; transmitting data from the server to the controlling applet; sending the data by the controlling applet to a set of display applets; and updating and displaying the set of display applets.

Additionally, one of the set of applets may be "torn off" a single browser window on a Web page and moved to another window on the same Web page. The "torn off" display applet will be continually updated by the controlling applet. Even if multiple display applets are "torn off" the single browser window, the controlling applet will continue to maintain a connection to the server and will continue to update each "torn off" display applet with new data.

Advantages of the invention include providing the display and updating of multiple display applets on a single Web browser window while maintaining only one connection to the server. Additionally, the invention allows the capability of tearing off a display applet from the single browser window and moving the display applet to another window while continually updating all the display applets.

A further understanding of the nature and advantages of the inventions herein may be realized by reference to the remaining portions of the specification and the attached drawings.

DETAILED DESCRIPTION OF SPECIFIC EMBODIMENTS

In the description that follows, the present invention will be described in reference to a preferred embodiment that operates on the Internet. In particular, examples will be described which illustrate particular applications of the invention on the Internet. The present invention, however, is not limited to any particular information source nor limited by the examples described herein. Therefore, the description of the embodiments that follow are for purposes of illustration and not limitation.

Figure 1:
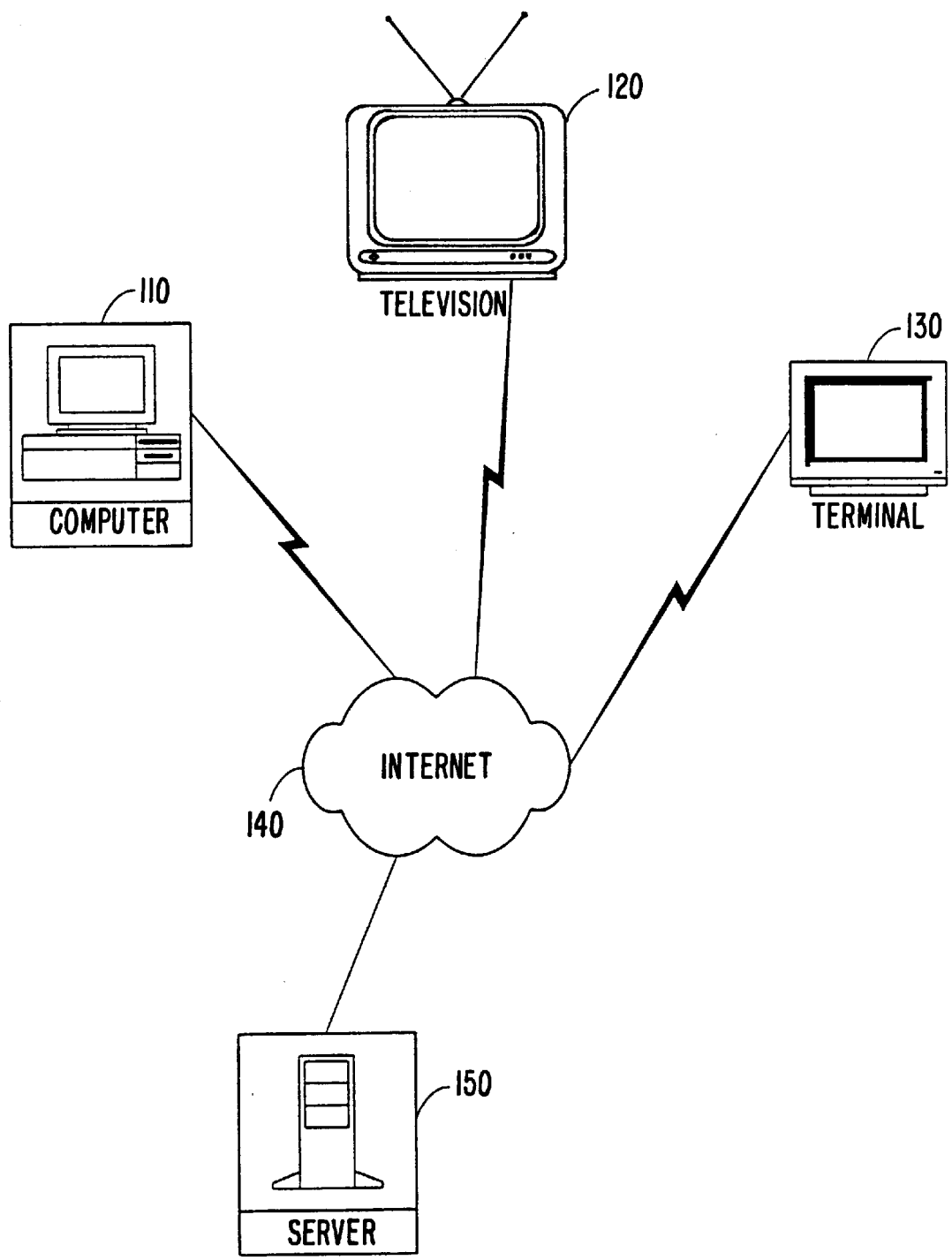
FIG. 1 illustrates some examples of multiple hardware systems networked over the Internet which are used to execute the software of an embodiment of the present invention.

FIG. 1 illustrates some examples of multiple hardware systems networked over the Internet which are used to execute the software of an embodiment of the present invention. A computer system 110, a television set 120, or a terminal 130 are some examples of hardware devices used to access the Internet 140. For convenience, the term "client" will be used to refer to the computer system 110, television set 120, or terminal 130. Generally to retrieve information through the Internet 140, a client program, such as Netscape or Microsoft Explorer, is run on the client to connect the client to a particular Web server 150.

Figure 2:
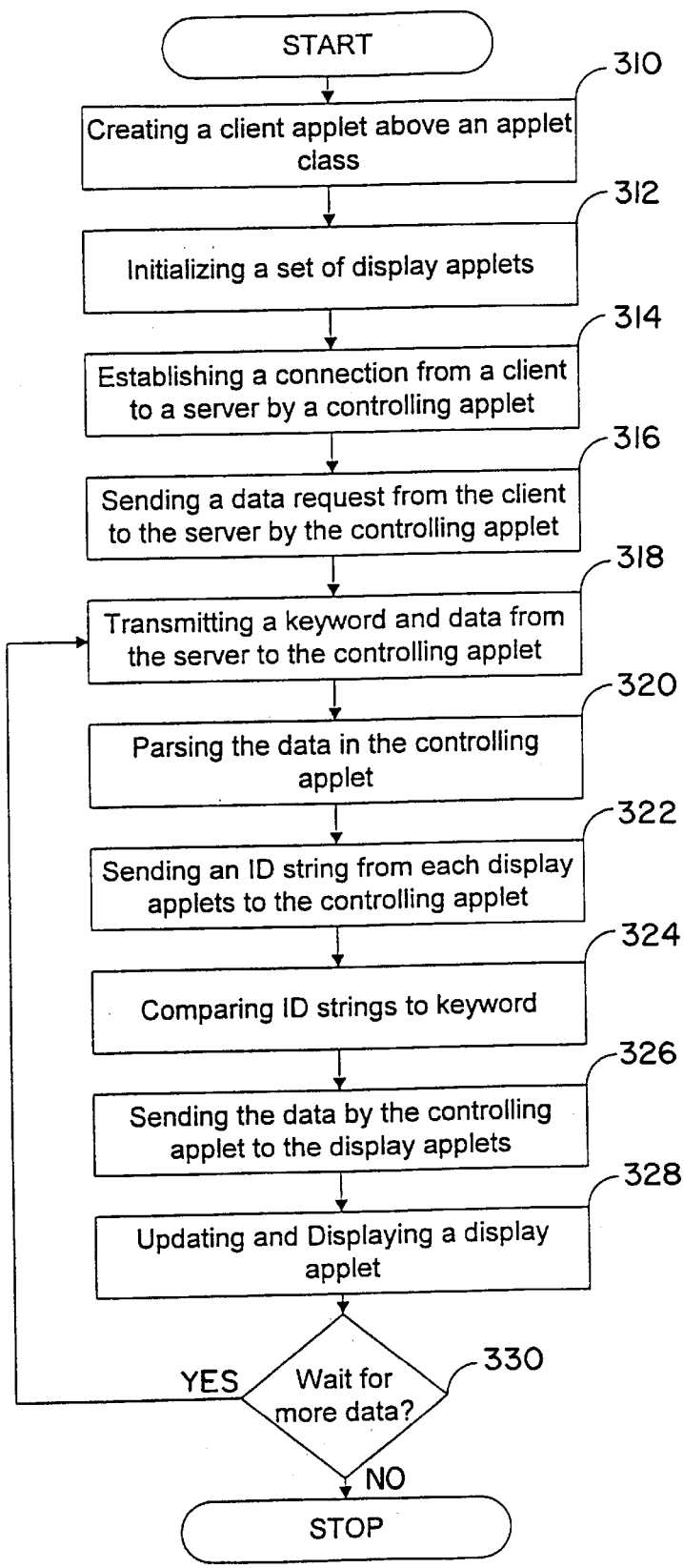
FIG. 2 illustrates a high level flowchart of a method of providing data to a set of display applets by a controlling applet.

FIG. 2 illustrates a high level flowchart of a method of providing data to a set of display applets by a controlling applet. At step 310, a client applet is created above an applet class where the client applet inherits functions from the applet class. The client applet is an abstract class which provides a higher level of inter-applet communication. Inter-applet communication occurs when a controlling applet interfaces and communicates with a set of display applets. The set of display applets and the controlling applet are all client applets.

Figure 5:
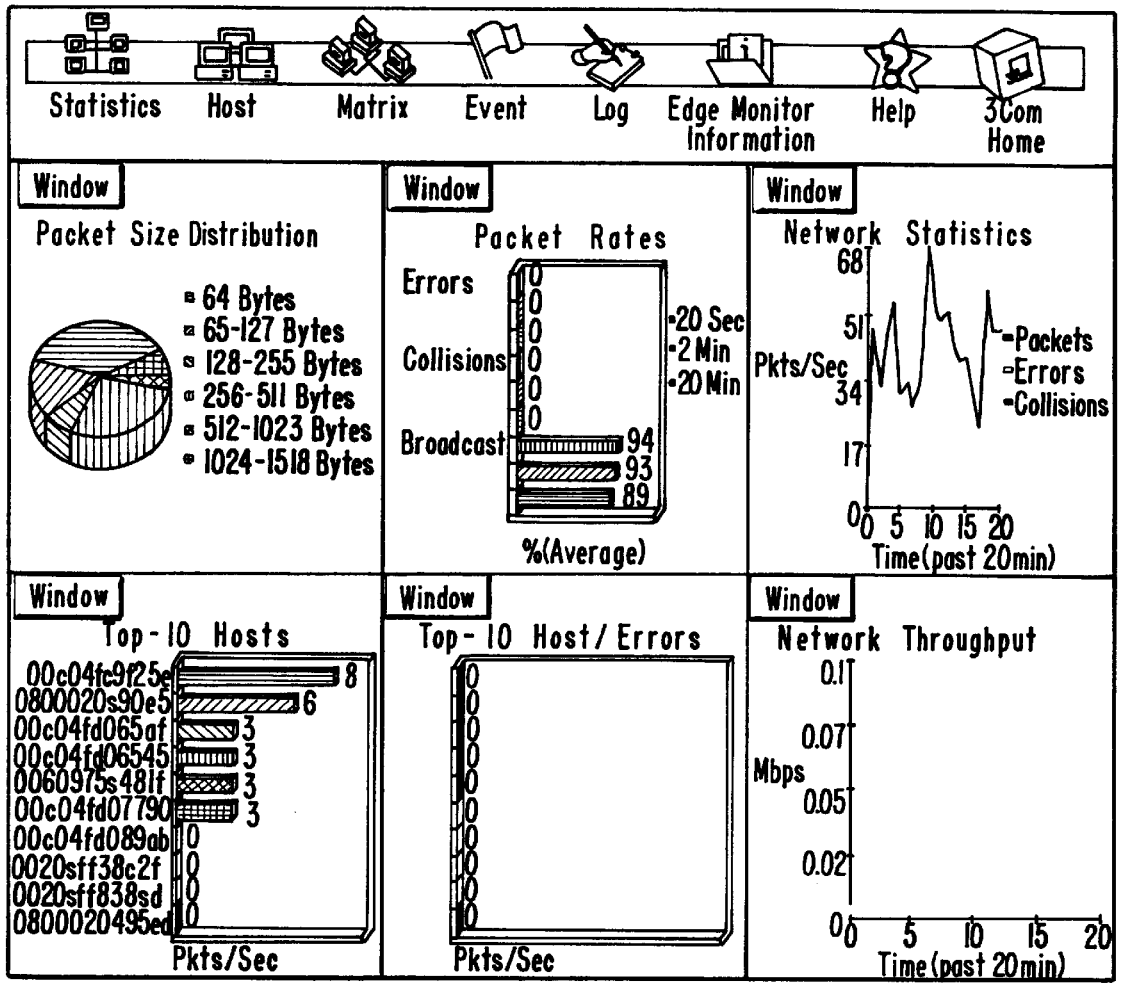
FIG. 5 illustrates a display of one embodiment of the invention which depicts the display of six display applets on a single browser window.

Typically, the controlling applet is a hidden applet. This means that its height and width parameters are zero. The height and width parameters are used to define screen space for the display of an applet. For example, in one embodiment as shown in FIG. 5, six display applets are displayed on a single browser window each display applet having a height parameter of 220 and a width parameter of 200.

The controlling applet is an active applet which means that it has established a connection to the server. The set of display applets are passive applets which means that they do not establish a connection to the server. Even though the passive applets do not have a connection to the server, their information is continually updated by the controlling applet.

At step 312, the set of display applets are initialized by the Java VM. At this time, the controlling applet waits for the Java VM to complete the initialization of all the display applets. After initialization, the controlling applet establishes a connection to the server for data transfer at step 314. Typically, a connection to the server is established within a thread. A thread is a parallel path of execution which runs independently.

At step 316, the controlling applet utilizes a thread to send a data request from the client to the server requesting new data. At step 318, the server responds by sending data which can be any structured data understood by the controlling applet. Typically, the data is a keyword, the data values, and an end of line indicator. For example, the new data is sent in the following format: pktdist 117.38 77.78 12.98 58.78 6.24 86.84 <EOL>. Thus, the keyword is "pktdist" corresponding to packet distribution.

At step 320, the data is parsed by the controlling applet. This involves the controlling applet breaking up the data into individual parts and processing each part separately. For example, the controlling applet filters out the "pktdist" label to determine which display applet to send the new data to.

At step 322, the controlling applet reads an ID string from each display applet. The ID string is used to inform the controlling applet which display applet is to receive the new data. For example, one display applet might provide the controlling applet a "pktdist" ID string. Once the controlling applet receives the ID string, it compares the ID string to the keyword at step 324. When the controlling applet finds a match between the ID string and the keyword, the controlling applet send the data to the appropriate display applet at step 326.

At step 328, the display applet that received the new data is updated. This generally requires a repainting or redisplaying operation. The display applets are generally displayed on a single browser window on a Web page.

At step 330, the controlling applet sends a request to the server for new data. If there is new data, steps 318 through 328 are repeated. If there is no new data, the controlling applet waits, typically for 30 seconds, and makes another request to the server for new data. Once all the display applets are closed, the thread that maintains the connection between the controlling applet and the server is terminated.

Although steps 310 through 330 are shown in a particular order, it is not required that these steps be performed in the order shown. Thus, the order shown in the flowchart is to illustrate one embodiment and not to limit the invention.

Figure 3:
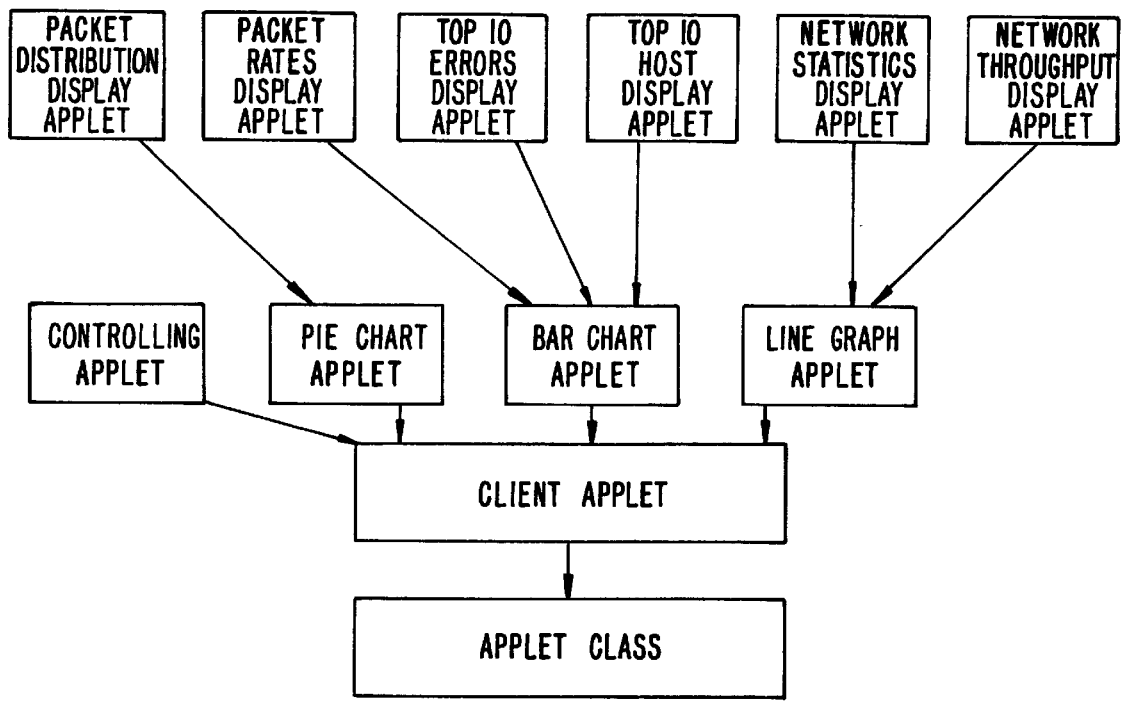
FIG. 3 illustrates the hierarchy of inheritance of one embodiment of the present invention.

FIG. 3 illustrates the hierarchy of inheritance of one embodiment of the present invention. The client applet inherits functions from the applet class. Pie Chart, Bar Chart, Line Graph, and Controlling Applet are all client applets. Furthermore, all the display applets are client applets and inherit functions from the applet class. Packet distribution, packet rates, top 10 errors, top 10 host, network statistics, and network throughput are all display applets which inherit functions from the client applet. Inter-applet communication occurs when the controlling applet communicates with the set of display applets.

Figure 4:
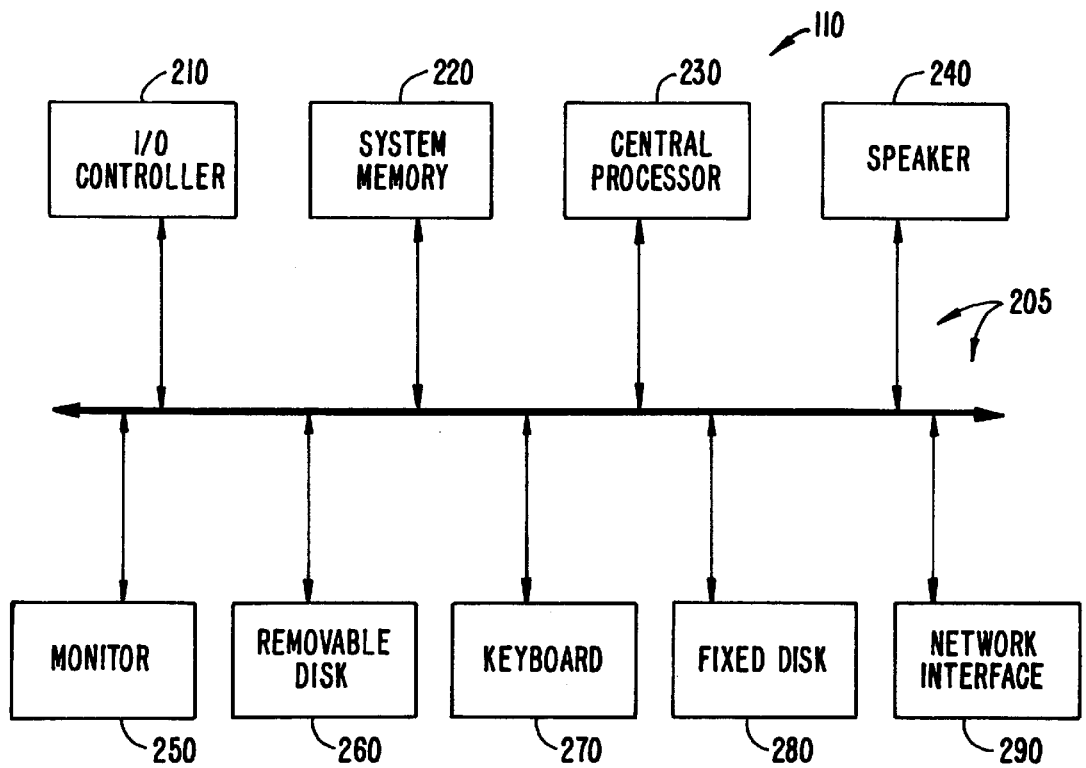
FIG. 4 illustrates a system block diagram of a typical computer system used to execute the software of an embodiment of the present invention.

FIG. 4 illustrates a system block diagram of a typical computer system 110 used to execute the software of an embodiment of the present invention. As shown in FIG. 4, computer system 110 includes speaker 240, monitor 250, and keyboard 270. Computer system 110 further includes subsystems such as I/O controller 210, system memory 220, central processor 230, removable disk 260 (e.g., CD-ROM drive), fixed disk 280 (e.g., hard drive), and network interface 290. Other computer systems suitable for use with the present invention may include additional or fewer subsystems.

Arrows such as 205 represent the systems bus architecture of computer system 110. These arrows illustrate the interconnection scheme used to link together the subsystems. For example, a local bus could be utilized to connect the central processor 230 to the keyboard 270. Computer system 110 shown in FIG. 1 is one example of a system suitable for use with the present invention. As shown in FIG. 1, a television set 120 and a terminal 130 are other examples of systems suitable for use with the present invention. Also, other configurations of subsystems suitable for use with the present invention will be readily apparent to one of ordinary skill in the art.

FIG. 5 illustrates a display of one embodiment of the invention which depicts the display of six display applets on a single browser window. As mentioned above, each display applet has a height parameter of 220 and a width parameter of 200. The controlling applet has a height and width parameter of zero.

By clicking on the "Window" icon at the upper left corner of each display applet, the user can move the particular display applet to another window. For example, if the user clicks on the "Window" icon corresponding to Packet Size Distribution, the "torn off" applet window will move to the upper top left corner of the user's display screen. Even though the "torn off" applet window is at another screen location, the "torn off" applet is still continuously being updated by the controlling applet. Furthermore, even if multiple applets are "torn off" the single browser window, the controlling applet will continue to maintain a connection to the server and will continue to update each "torn off" applet with new data. This results in continually updating multiple display applets while maintaining only one server connection.

The invention has now been explained with reference to specific embodiments. Other embodiments will be apparent to one of ordinary skill in the art. It is therefore not intended that this invention be limited, except as indicated by the appended claims.

What is claimed is:

1. A method of providing data to a plurality of display applets comprising the steps of:
   creating a client applet above an applet class for inter-applet communication with a plurality of display applets;
   initializing said plurality of display applets;
   establishing a connection from a client to a server by a controlling applet;
   sending a data request from said client to said server by said controlling applet;
   reading an identification string from each one of said plurality of display applets by said controlling applet;
   transmitting a keyword and data from said server to said controlling applet;
   parsing said data in the controlling applet;
   comparing said identification string to said keyword by said controlling applet;
   sending said data by said controlling applet to said plurality of display applets based on the results from said step of comparing said identification string to said keyword; and
   updating and displaying said plurality of display applets.

2. The method as recited in claim 1 wherein said step of updating and displaying said plurality of display applets is performed on a single browser window on a Web page.

3. The method as recited in claim 2 further comprising the step of moving one of said plurality of display applets to another window.

4. The method as recited in claim 1 wherein said plurality of display applets are updated with said data by said controlling applet.

5. The method as recited in claim 1 wherein said controlling applet sends said data to said plurality of display applets.

6. The method as recited in claim 1 wherein said connection is performed in a thread.

7. The method as recited in claim 1 wherein said controlling applet inherits a set of functions from said applet class.

8. The method as recited in claim 1 wherein said data comprises of any structured data understood by said controlling applet.

9. The method as recited in claim 1 wherein said step of displaying said plurality of display applets comprises displaying six display applets on said single browser window on said Web page.

10. The method as recited in claim 1 wherein said step of sending a data request from said client to said server by said controlling applet is repeated after a selected period of time.

11. A method of providing data to a plurality of display applets comprising the steps of:
    establishing a connection from a client to a server by a controlling applet;
    transmitting data from said server to said controlling applet;
    sending said data by said controlling applet to a plurality of display applets; and
    updating and displaying said plurality of display applets.

12. The method as recited in claim 11 further comprising the step of reading an identification string from said plurality of display applets by said controlling applet.

13. The method as recited in claim 12 wherein said data comprises a keyword and further comprising the step of comparing said identification string to said keyword by said controlling applet.

14. The method as recited in claim 11 wherein said data comprises a keyword, a numerical value, and an end of data indicator.

15. A computer program product for providing data to a plurality of display applets, said product comprising:
    code that creates a client applet above an applet class for inter-applet communication with a plurality of display applets;
    code that establishes a connection from a client to a server by a controlling applet;
    code that reads an identification string from each one of said plurality of display applets by said controlling applet;
    code that transmits a keyword and data from said server to said controlling applet;
    code that compares said identification string to said keyword;
    code that sends said data by said controlling applet to said plurality of display applets; and
    a computer-readable medium for storing said codes.

16. The computer program product as recited in claim 15 further comprising code that parses said data in said controlling applet.

17. The computer program product as recited in claim 15 further comprising code that updates and displays said plurality of display applets.

18. The computer program product as recited in claim 15 further comprising code that initializes said plurality of display applets.

19. The computer program product as recited in claim 15 further comprising code that sends a data request from said client to said server by said controlling applet.

* * * * *